United States Patent von Blücher et al.

[11] Patent Number: 5,395,428
[45] Date of Patent: Mar. 7, 1995

[54] FILTER MATERIAL FOR MOTOR VEHICLES

[76] Inventors: Hasso von Blücher, Parkstr.10, D-4006 Erkrath; Ernest De Ruiter, Höhenstr. 57a, D-5090 Leverkusen, both of Germany

[21] Appl. No.: 104,948

[22] Filed: Aug. 10, 1993

Related U.S. Application Data

[63] Continuation of Ser. No. 761,753, Oct. 9, 1991, abandoned.

[30] Foreign Application Priority Data

Jan. 23, 1990 [DE] Germany .......... 40 01 831.8
Mar. 9, 1990 [DE] Germany .......... 40 07 536.2
Jul. 11, 1990 [DE] Germany .......... 40 22 060.5

[51] Int. Cl.$^6$ .............................. B01D 53/04
[52] U.S. Cl. ...................... 95/104; 95/146; 96/143; 96/154
[58] Field of Search .............. 95/95, 104, 146; 96/143, 153–154

[56] References Cited

U.S. PATENT DOCUMENTS

| | | | |
|---|---|---|---|
| 3,581,782 | 6/1971 | Onufer | 96/146 X |
| 3,683,597 | 8/1972 | Beveridge et al. | 96/139 |
| 3,865,758 | 2/1975 | Yoshida et al. | 521/63 X |
| 4,028,075 | 6/1977 | Roberge | 210/172 X |
| 4,058,380 | 11/1977 | King, II | 96/144 |
| 4,239,516 | 12/1980 | Klein | 502/62 |
| 4,381,929 | 5/1983 | Mizuno et al. | 96/130 |
| 4,699,681 | 10/1987 | Kasmark, Jr. et al. | 96/134 X |
| 4,800,190 | 1/1989 | Smolik | . |
| 4,869,739 | 9/1989 | Kanome et al. | 96/153 X |
| 4,906,263 | 3/1990 | von Blücher et al. | 96/135 |
| 4,981,501 | 1/1991 | von Blücher et al. | 96/153 |
| 4,992,084 | 2/1991 | von Blücher et al. | 96/131 |
| 5,002,596 | 3/1991 | Moskaitis et al. | 96/152 |

FOREIGN PATENT DOCUMENTS 0340542 11/1989 European Pat. Off.

*Primary Examiner*—Robert Spitzer
*Attorney, Agent, or Firm*—Cohen, Pontani, Lieberman, Pavane

[57] ABSTRACT

An adsorption filter to prevent the emission of hydrocarbons from the tanks of motor vehicles comprises a highly air-permeable, substantially stable, three-dimensional bearer structure of wires, monofilaments or webs to which is secured a layer of granular, especially bead-structured adsorbent particles with a diameter of 0.1 to 1 mm, whereby the size of the micropores of the adsorbent is reduced in the direction of flow of the hydrocarbons emitted.

11 Claims, No Drawings

FILTER MATERIAL FOR MOTOR VEHICLES

This application is a continuation of application Ser. No. 07/761,753, filed Oct. 9, 1991, now abandoned.

Gasoline-powered motor vehicles are highly significant sources of hydrocarbons that pollute the air. That poorly tuned engines emit considerable levels of incompletely burned fuel is known. Approximately 50,000 tons of hydrocarbons, however, are released into the environment in the Federal Republic of Germany every year just from adding gasoline to fuel tanks. The space inside the tank not occupied by liquid fuel is saturated with hydrocarbon gas, a lot of which is expelled when gasoline is added.

There are basically two ways today of preventing these vapors from escaping into the atmosphere.

1. A recirculation system can be integrated into the gasoline pump. This approach entails significant investment, and means that the gasoline-pump nozzle has to fit every gasoline tank opening.

2. An active-charcoal filter can be accommodated in the vehicle for the expelled vapors to travel through and be absorbed in for later resorption into fresh air suctioned in by the engine and combustion within the engine.

The second solution is of advantage in that it not only requires significantly less investment but can be introduced step by step and will also handle any vapors that escape during the tank's normal oscillations (breathing) in temperature and pressure. The currently available filters of course have a number of drawbacks that make the automotive industry hesitant to install them.

Cylindrical filter canisters similar to the classical particle filters are beginning to be used in the United States. They accommodate two kilograms of compressed carbon compacted under slight pressure. Compressed carbon, however, does not resist abrasion very well, and the vehicles' inherent jolting and vibration leads to abrasion and hence obstruction. Local compacting creates channels and regions of high resistance, entailing non-uniform exploitation of the carbon and fracturing. Since only a slight loss of pressure is acceptable, the particles of active carbon must be really large. Their size means extensive distances for the material being adsorbed or desorbed to travel when penetrating them, and the kinetics of the process are poor. Finally, the rather large and rigid canisters are difficult to accommodate in a passenger vehicle, every spare cubic inch of which is being exploited nowadays, and the attempt to provide room often means total reorganization.

The object of the present invention is accordingly to improve adsorption of the hydrocarbons that occur while a gasoline tank is being filled or while the tank is breathing and to prevent their escape.

The filter employed in accordance with the invention consists of a highly air-permeable and essentially shape-retaining three-dimensional supporting skeleton with a layer of granular adsorber particles 0.1 to 1 mm in diameter secured to it. Filters with such a supporting framework and granular adsorbers are described for example in German OS 3 813 563.

Highly air-permeable filters in the present sense are those with an impedance of less than 100 and preferably between 10 and 30 Pa to air flowing through a filter 1 cm thick at a speed of 1 m/sec. Motor vehicles in the sense of the present invention are not only automobiles and trucks but also any boats and aircraft powered by internal-combustion engines employing gasoline as a fuel.

One particularly appropriate filter is made of a reticulated expanded polyurethane with a pore count of 5 to 25 and preferably 10 to 20 pores per inch (ppi) and with spherules of active carbon 0.1 to 1 mm in diameter adhering to its inner and outer surfaces. The small and extremely hard spherules do not rub against one another and there is accordingly no abrasion. The large apertures in the matrix ensure very little loss of pressure and a very uniform flow. A filter material of this type can be of any desired shape—sheet, cylinder, slab, etc.—and completely irregular. It can even be packed into tubing. Essentially, any available space can be exploited. The very extensive outer surface of the spherules and the short distances for the adsorbate to travel ensure optimal utilization of their capacity, making it possible to use much less—approximately 50% less—active carbon than is used in known filters. When a filter has to be replaced, all of the material is removed from the framework in one piece with no possibility of contamination. It is as easy to replace as a video cassette.

Gasolines have a mean boiling range of 30° to 200° C. and consist primarily of hydrocarbons with 4 to 12 carbon atoms. To adsorb the volatile constituents requires relatively small micropores. To desorb the higher boiling-point constituents again, however, requires relatively large micropores. The resulting contradiction cannot always be satisfactorily resolved.

To allow optimal desorption of the higher and lower boiling-point constituents of the fuel, distributing the adsorbents throughout the filter with the size of their micropores decreasing in the direction the emerging hydrocarbons are flowing in is hereby recommended. The decrease in the diameter of the granules of adsorber attached to the air-permeable support can be continuous or incremental. The filter will accordingly comprise two or more layers containing adsorbents with regions of different micropore diameter.

The complete filter package in one preferred embodiment of the invention is in at least two sections, with the first section trapping the less volatile constituents, which would poison the fine-pored adsorber. This initial filter layer, which could also be called a preliminary filter, contains adsorbers with large micropores. Although it intercepts only a small portion of the volatile constituents, it does adsorb all the higher boiling-point constituents.

It is predominantly the more volatile constituents, butanes and pentanes for example, that are adsorbed in the second and directly adjacent section, which contains adsorbers with small micropores. The higher boiling-point constituents, which it would be impossible to desorb from the small micropores, have already precipitated in the first section. Since desorption with fresh air occurs in the opposite direction, it is impossible for the small micropores to clog up with "high boilers." Full capacity is accordingly maintained.

When the adsorption filter to be employed in accordance with the invention only contains adsorbers with a specific range of micropores, adsorbers with pore diameters essentially ranging from 3 to 18 Å (0.3 to 1.8 nm) are recommended. In this event the adsorption filter will have only one section with one type of adsorbing granules.

Appropriate adsorbers constitute a) Active carbon with a micropore diameter essentially in the vicinity of 6±14 Å.
b) Polymeric adsorbers, especially those based on divinyl benzene, with a micropore diameter essentially ranging from 5 to 15 Å.
c) Hydrophobic molecular sieves with a pore diameter of 3 to 18 Å.

These various types of adsorber with a relatively wide range of micropore diameter can be attached to the matrix in the form of conceivable mixtures or the filter can consist of layers of adsorbents a), b), or c) from essentially the same range of micropores at a right angle to the flow of emerging hydrocarbons.

The following adsorbents can be employed for the larger-pore filter layer (preliminary filter), which the hydrocarbon vapor that occurs flows through first:

a) Active carbon with micropores of a diameter of essentially 10 to 20 and preferably 15 to 20 Å. Such large-pored active carbons are commercially available for purifying water for example. Their inner surface is usually 800 to 1200 m²/g.
b) Polymeric adsorbers, also called organic molecular sieves, which are essentially porous organic polymers based on styrene and divinyl benzene with pore diameters of essentially 8 to 80 Å. Such adsorbers have inner surfaces of 600 to 1600 m²/g. They are commercially available under the brand Bonopore$^{(R)}$ for example.
c) Hydrophobic molecular sieves with a pore diameter ranging essentially from 8 to 18 Å. These have the crystalline structure of normal zeolitic molecular sieves, although they adsorb organic molecules and hardly any water vapor. Water intake is extremely slight, even in the presence of relatively much moisture. Zeolite of this type are sold under the designation hydrophobic zeolite by the firm of Munters Zeol AB for example. Similar conventional zeolite called DAY ("de-aluminized Y") zeolite are available from Degussa AG.

It is practical to position a filter layer with smaller micropores made of one of the following materials downstream of such a large-pore filter layer (preliminary filter):

a) Active carbon with a micropore diameter of essentially 8±2 Å.
b) Polymeric adsorbers with micropores with a diameter ranging from 4 to 8 Å, like those commercially available under the brand Sorbathene. These have inner surfaces of approximately 1400 to 1600 m²/g.
c) Hydrophobic molecular sieves with a pore size of 2 to 9 Å. Their characteristics are those of the hydrophobic molecular sieves employed in the preliminary-filter layer.

Active-carbon spherules with coal-tar pitch, petroleum pitch, or asphalt as a starting material are preferred. The spherules of pitch are rendered infusible by oxidation, and then carbonized and activated. The inner surfaces range from 600 to 1600, depending on the extent of activation.

Another appropriate starting material is spherules deriving from the copolymerization of styrene and divinyl benzene. The spherules of active carbon obtained therefrom by pyrolysis with or without additional activation are characterized by a hard shell, numerous micropores in the range of 5 to 10 Å, and satisfactory transport pores. The micropores occupy as much as 0.5 ml/g of the active carbon for example.

It is also possible to use, instead of the aforesaid spherules of active carbon, more or less spherical agglomerates of milled active carbon and an appropriate binder obtained by pelleting as described for example in German A 3 510 209. The advantage of this process is that various types of active carbon and different adsorbents can be employed, and specific adsorptive properties can be purposefully demanded.

The preferred adhesive compounds, binders, and binder dispersions employed in accordance with the invention to attach the granules of adsorber to the matrix are those that cure subject to heat.

Preferred are adhesive compounds of polymers that can be cross-linked but travel through a viscosity minimum before doing so. Such adhesive systems as Bayer's high-solid polyurethane-reactive Imprim$^{(R)}$ products for example are initially highly viscous, meaning that they exhibit satisfactory initial adhesion when the supporting skeleton is sprinkled with particles of adsorber. They exhibit a severe decrease in viscosity as temperature increases, resulting in improved wetting of the adsorber particles and hence particularly satisfactory adhesion subsequent to cross-linkage curing. Small constrictions occur at the points of contact between the supporting skeleton and the adsorber particles while the viscosity minimum is being traveled through. Due to the practically punctate attachment of the particles of adsorber, almost their whole surface will be available to the gas being purified subsequent to curing.

The binders or adhesion systems must be resistant to hydrocarbon, meaning that they must neither dissolve nor expand when they come into contact with the liquid hydrocarbons or their vapors.

The aforesaid adsorbers, supports, and adhesives are examples that do not exclude other systems with basically the same function. Depending on the shape of the filter's housing, it is also possible to employ more than two filter sections with adsorbers that have incrementally decreasing micropore diameters. The vapors will always initially contact the filter layer with the larger micropores and exit the filter by way of the layer with the smallest micropores, whereas desorption will occur subject to fresh air in the opposite direction.

We claim:

1. Method of diminishing the escape of hydrocarbons from motor-vehicle tanks, characterized in that the gasoline vapors forced out when the tank is filled or escaping when the tank breathes are diverted through an adsorption filter comprising a highly air-permeable and essentially shape-retaining three-dimensional supporting skeleton of wire, monofilament, or webs with a layer of granular particles 0.1 to 1 mm in diameter of an adsorbed with a mean micropore diameter of 3 to 18 Å secured to it and in that the adsorbed hydrocarbons are desorbed by fresh air suctioned in by the engine and burned in the engine, the adsorbed having micropores decreasing in size along the direction in which the emerging hydrocarbon vapors flow.

2. Method as in claim 1, characterized in that desorption proceeds in the opposite direction from adsorption.

3. Method as in claim 1, characterized in that the supporting skeleton is a large-pored reticulated expanded polyurethane.

4. In combination, a gasoline tank and an adsorption filter for preventing escape of gasoline hydrocarbon vapors from said tank, said adsorption filter comprising a highly air-permeable and essentially shape-retaining three-dimensional support skeleton of wire, monofilament, or webs with a layer of granular adsorbed particles 0.1 to 1 mm in diameter secured to it, the layer of adsorber particles having micropores decreasing in size along the direction in which the emerging hydrocarbon vapors flow.

5. A combination as in claim 4, characterized in that the micropores decrease incrementally.

6. A combination as in claim 4, characterized in that the supporting skeleton is a large-pores reticulated expanded polyurethane.

7. A combination as in claim 6, characterized in that the expanded polyurethane weighs 20 to 60 g/l and has pores with diameters of 1.5 to 3 mm.

8. A combination as in claim 4, characterized in that the adsorbent has multiple layers including a large-pores filter layer, the first that the emerging hydrocarbons flow through, which contains adsorbed particles of one of the following materials:

a) active carbon with micropores of a diameter of essentially 10 to 20 Å, b) porous organic polymers with pore diameters of 8 to 80 Å, or c) hydrophobic molecular sieves with a pore diameter ranging essentially from 8 to 18 Å.

9. A combination as in claim 4, characterized in that a fine-pored filter layer of one of the following materials is positioned downstream of the large-pored filter layer (preliminary filter) in the direction traveled by the emerging hydrocarbons:

a) active carbon with micropores with a diameter of essentially 6 to 10 Å, b) polymeric adsorbers with a pore diameter of essentially 4 to 8 Å, c) hydrophobic molecular sieves with a pore size of 2 to 9 Å.

10. A combination as in claim 4, characterized in that the adsorber particles are attached with an adhesive system that travels through a viscosity minimum prior to curing.

11. A combination as in claim 10, characterized in that the adhesive system consists of polyurethane pre-polymers with blocked NCO groups and a cross-linker and up to 20% solvent.

* * * * *